United States Patent [19]
De Tonnac

[11] Patent Number: 6,123,891
[45] Date of Patent: Sep. 26, 2000

[54] METHOD FOR MOLDING ELASTOMERIC PROFILE MEMBERS

[76] Inventor: Jacques De Tonnac, 22, rue Parmentier, F-01200 Bellegarde-sur Valserine, France

[21] Appl. No.: 09/160,291

[22] Filed: Sep. 25, 1998

Related U.S. Application Data

[63] Continuation of application No. PCT/IB97/00264, Mar. 17, 1997.

[30] Foreign Application Priority Data

Mar. 27, 1996 [FR] France ................................ 96 04081

[51] Int. Cl.⁷ .......................... B29C 43/04; B29C 43/14; B29C 65/02; B29C 65/18
[52] U.S. Cl. ........................ 264/296; 264/320; 264/326; 425/395; 425/408; 425/411; 156/110.1; 156/304.2; 156/304.5; 156/304.6
[58] Field of Search ..................... 264/249, 294, 264/296, 320, 322, 326; 425/395, 398, 408, 411; 249/57, 78, 98, 99; 156/110.1, 304.1, 204.2, 204.6, 304.5

[56] References Cited

U.S. PATENT DOCUMENTS 2,184,630  12/1939  Alexander .
2,343,117   2/1944  Vincent .
4,680,071   7/1987  Candle ................................ 156/218
5,110,274   5/1992  Hatai et al. ........................... 425/28.1

FOREIGN PATENT DOCUMENTS 1215194   1/1960  France .
1500618  11/1967  France .
2930289   2/1981  Germany .
4038656   7/1991  Germany .
 665009   4/1988  Switzerland .
   8554   5/1913  United Kingdom .

*Primary Examiner*—Jill L. Heitbrink
*Assistant Examiner*—Michael I. Poe
*Attorney, Agent, or Firm*—Henderson & Sturm LLP

[57] ABSTRACT

A method for molding a closed profile member such as a sealing gasket, sequentially comprising a static step of molding a series of contiguous segments of an unprocessed strip with two ends. Each segment is moved substantially over its own length so that it is replaced by the following segment once it has been molded, and the final segment is made by juxtaposing, connecting and molding the two ends of the unprocessed strip together. A mold with two mold tools operative along part of its length is used to carry out the method. A temperature gradient is generated so that the temperature at the mold ends is 25–35° C. lower than the temperature at the center. The mold is part of a fixed or portable device including mold heating means and means for exerting pressure on the unprocessed strip.

11 Claims, 4 Drawing Sheets

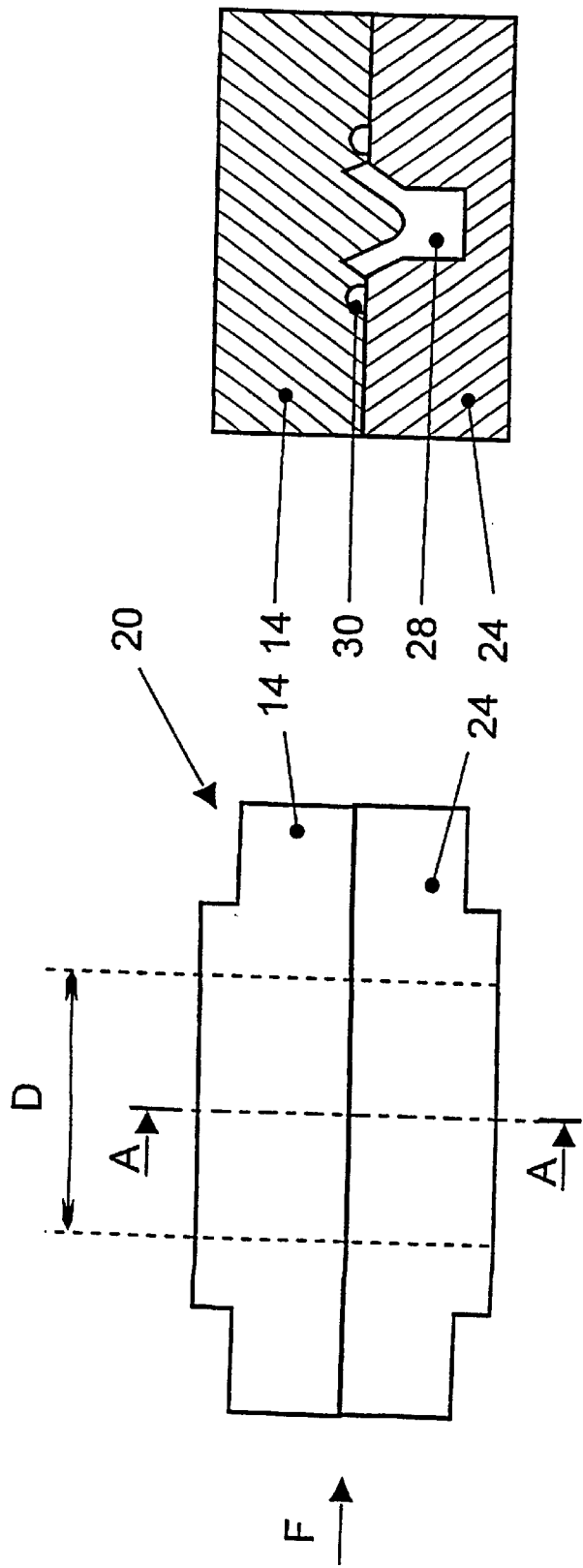

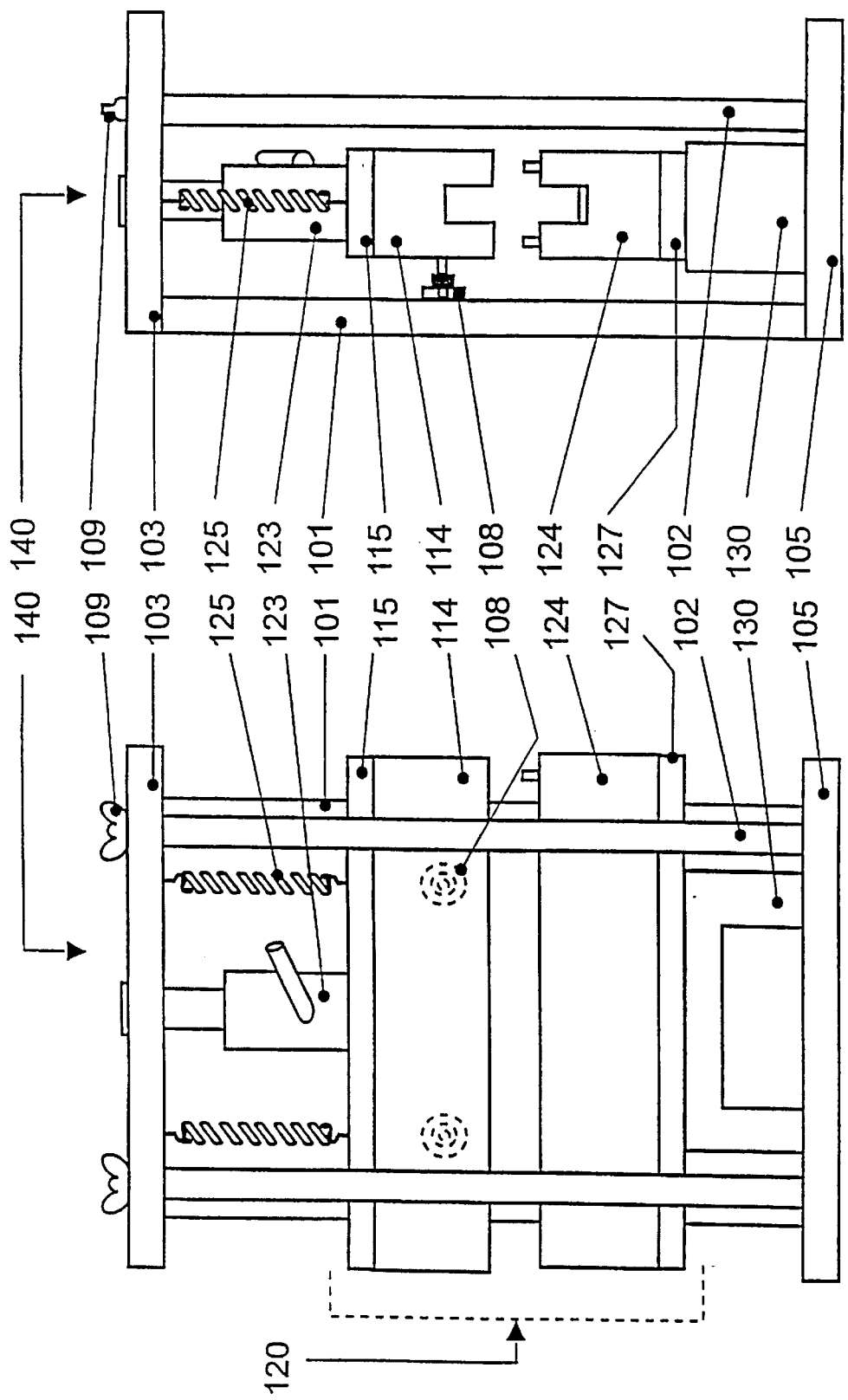

METHOD FOR MOLDING ELASTOMERIC PROFILE MEMBERS

CROSS-REFERENCE TO RELATED APPLICATIONS

This is a continuation of co-pending International application Ser. No. PCT/IB97/00264, filed Mar. 17, 1997, entitled "METHOD FOR MOULDING ELASTOMERIC PROFILE MEMBERS" the disclosure of which in its entirety is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates to a molding process for producing elastomeric profiles, for example straps, belts, gaskets, etc. and, in particular, for obtaining closed profiles. More specifically, molding is carried out sequentially, the process according to the invention being particularly suitable for obtaining elastomeric profiles with a large circumference, for example profiles having a diameter of at least one meter. The term "molding" is generally interpreted as the combined operations of molding and vulcanization of a preform.

The invention also relates to a portable device or portable "mold" used for manufacturing or finishing profiles, in particular seals, in situ, that is on the actual site where they are to be used. This portable version is of great interest as it eliminates delays for delivery, the storage of ad hoc stock and, in particular, affords the possibility of producing directly or finishing on site a profile having the exact size required for the parts to be assembled. This deciding factor allows maintenance operations directly on site as soon as it is noticed, for example, that a seal or other profile needs to be changed.

For the sake of clarity and simplicity in the specification, the invention will be described hereinafter in relation to seals or gaskets, but it should be understood that it also relates to other types of profiles such as straps, belts and the like which pose the same problem of production and finishing as seals.

2. Description of the Prior Art

The known processes for producing elastomeric gaskets generally involve compression or injection molding or extrusion techniques.

The techniques of molding by compression with a closed circular mold and by injection are not suitable for obtaining large circumference seals. In fact, the mold used defines the profile of the seal and also its diameter in both cases. Consequently, the maximum circumference of the seal is limited by the dimensional capacities of the press receiving the mold and by criteria concerning bulk. Furthermore, for the same seal profile it is necessary to use a different mold for each different diameter.

Large circumference seals are generally obtained by an extrusion process. In a process of this type, molding of the seal takes place dynamically by continuously advancing material through a die to form the shape of the seal. For a given seal profile, a single die is required whatever the diameter of the desired seal.

However, a major drawback of this process resides in the need to abut the two ends of the seals molded in this way, after molding, in order to obtain a closed element. This abutment is generally carried out by hot or cold adhesion which is manifested by a discontinuity in vulcanization and incidentally by an alteration in the intrinsic characteristics of the seal, in particular the tear strength.

Furthermore, the dimensional tolerances of the section of the seal obtained by extrusion are relatively wide, for example of the order of ±0.6 mm over a section of 15 mm, and results in a relatively coarse surface, two parameters which have a great influence on the quality of the seal.

A sequential molding process adapted to the production of rubber belts is also known. The preform of these belts are closed and with the molding taking place after this preform has been tensioned between two opposing pulleys of which the spacing is adjustable as a function of the desired length of the belt.

In this process, the length of the elements is necessarily limited by the spacing between the pulleys which cannot be too distant for reasons of bulk. Furthermore, vulcanization of adjoining segments of belt causes edge effects or over-vulcanization, which also leads to irregularities in the characteristics of the finished elements.

BRIEF SUMMARY OF THE INVENTION

The object of the present invention is to overcome the aforementioned problems by proposing a process for molding profiles, for example closed gaskets, allowing the production of completely vulcanized large circumference seals, the same mold allowing the manufacture of seals of identical profile and of unlimited diameter. Furthermore, the seals thus obtained do not have to be abutted or connected by any additional means, for example by hot or cold adhesion, in order to form closed elements from them or again by overlapping of the two ends as described, for example, in U.S. Pat. No. 4,680,071.

Owing to this process, the dimensional tolerances of the cross section of the seal are closer, for example of the order of ±0.25 mm over a section of 15 mm and results in a much finer surface, allowing the seal to be optimized.

In the remainder of the description, an unprocessed strip will be understood as a strip of elastomeric material in the preform, that is unmolded, stage cut to the length corresponding to the desired diameter of the seal to be obtained. Furthermore, a segment will be considered as the length of unprocessed strip corresponding to the length of the active regions of the mold used.

A process involving successive molding has also already been described in German Patent 2930289 which mentions that unprocessed material is arranged in a closed circle for the purpose of molding.

The object of the aforementioned invention is achieved by means of a process for molding a closed elastomeric profile, for example a seal, in which the static molding of an unprocessed strip in adjacent successive segments is carried out sequentially, the strip having two open ends, each segment being displaced substantially by its length to take the place of the previous one after the molding thereof, the last segment consisting of the juxtaposition of the two ends of the unprocessed strip. Prior to the molding of the first segment, the first end of the unprocessed strip is left unprocessed and after the successive operations of molding adjacent segments, the other end of the unprocessed strip is also left unprocessed, these two ends then being juxtaposed so they can be molded together, the length of this juxtaposition representing a length at least equal to the length of a segment.

Contrary to the above-mentioned specification U.S. Pat. No. 4,680,071, there is no overlap at the ends which would merely introduce an irregularity into the final seal which would adversely affect the quality and strength thereof.

The two ends to be abutted by juxtaposition, without an overlap, can be straight or beveled, obviously with the same bevel angle so that they can exactly mate with or lengthen one another.

The mold used for carrying out this molding process preferably comprises two tools of which at least one is movable, the connection of the cavities made in the internal surfaces of each of the tools defining the impression corresponding to the form of seal to be produced, this mold bing a mold which is open at its two ends, the length of the active region of the mold, that is the regions where each segment of strip is effectively molded, being smaller than the total length of the mold. In this case, the length of the successive segments and therefore of the displacements of the mold between each molding operation is substantially equal, not to the total length of the mold but to the length of its active region.

The active region of the mold advantageously represents a length of between 35% to 60% of the total length of the mold, for example 50%.

It is unnecessary to cool the edges of the mold to prevent incipient vulcanization in the immediately external regions, as recommended, for example, in Great Britain Patent M08554, even though this document does not relate to molding by successive segments.

According to a preferred embodiment, the ends of the cavity made in one of the tools each end at an angle of between 3 and 10 degrees.

The height of the impression is preferably greater at the ends of the mold than in its center. The temperature in the interior of the impression gradually decreases from each edge of the active region of the mold up to each of its ends, this temperature variation between each end of the impression and the active region of the mold being between 25° C. and 35° C.

The device for carrying out this molding process preferably comprises a mold as described herein, means for heating the mold an means for exerting a pressure on the unprocessed strip, such as a press.

A portable device of this type advantageously has heating means internal to the mold.

Advantageously again, this portable device is used to carry out the molding of the unprocessed ends of a seal obtained by means of the present process or the finishing on site, that is directly on the element on which it is to be mounted, of the still open seal by molding of the two juxtaposed unprocessed ends of the unprocessed strip constituting the last segment, with all the advantages which this affords and which have been set out at the beginning of the specification.

BRIEF DESCRIPTION OF THE SEVERAL VIEWS OF THE DRAWINGS

The invention will be understood better after examination of an embodiment given as a non-limiting example and illustrated in the accompanying drawings.

FIG. 2 is a front view of the mold used in the process according to the invention.

FIG. 3 is a section along A—A of the mold in FIG. 2.

FIG. 4 is a view in the direction of the arrow F of the end of the lower tool of the mold in FIG. 2.

FIG. 7 is a front view of the portable molding device for joining seals obtained by the process according to the invention.

FIG. 8 is a side view of the portable device in FIG. 7.

DETAILED DESCRIPTION OF THE INVENTION

Figure 1A:
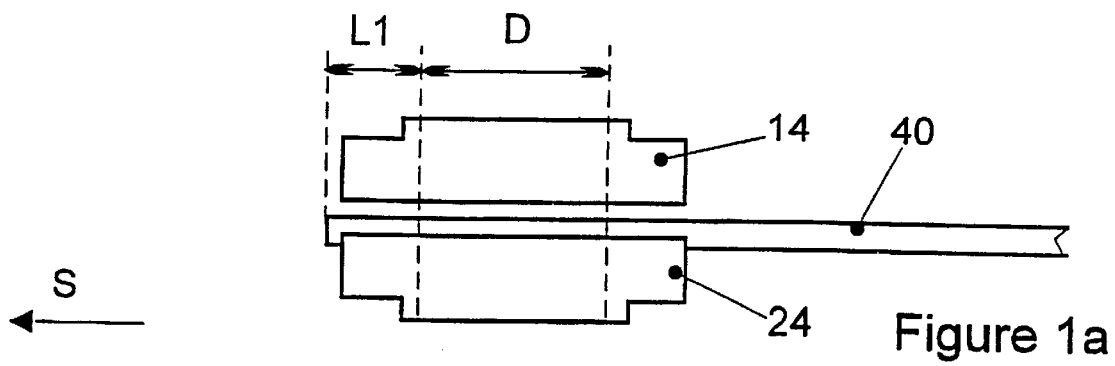
FIGS. 1a, 1b, 1c and 1d show the various stages of molding of an unprocessed strip by the process according to the invention.

As illustrated in FIG. 1a, the process for molding elastomeric gaskets employs a metallic mold 20 defined in FIG. 2 to 4 and composed of an upper part, or upper tool 14, and a lower part, or lower tool 24, and an unprocessed strip 40.

Figures 5, 6:
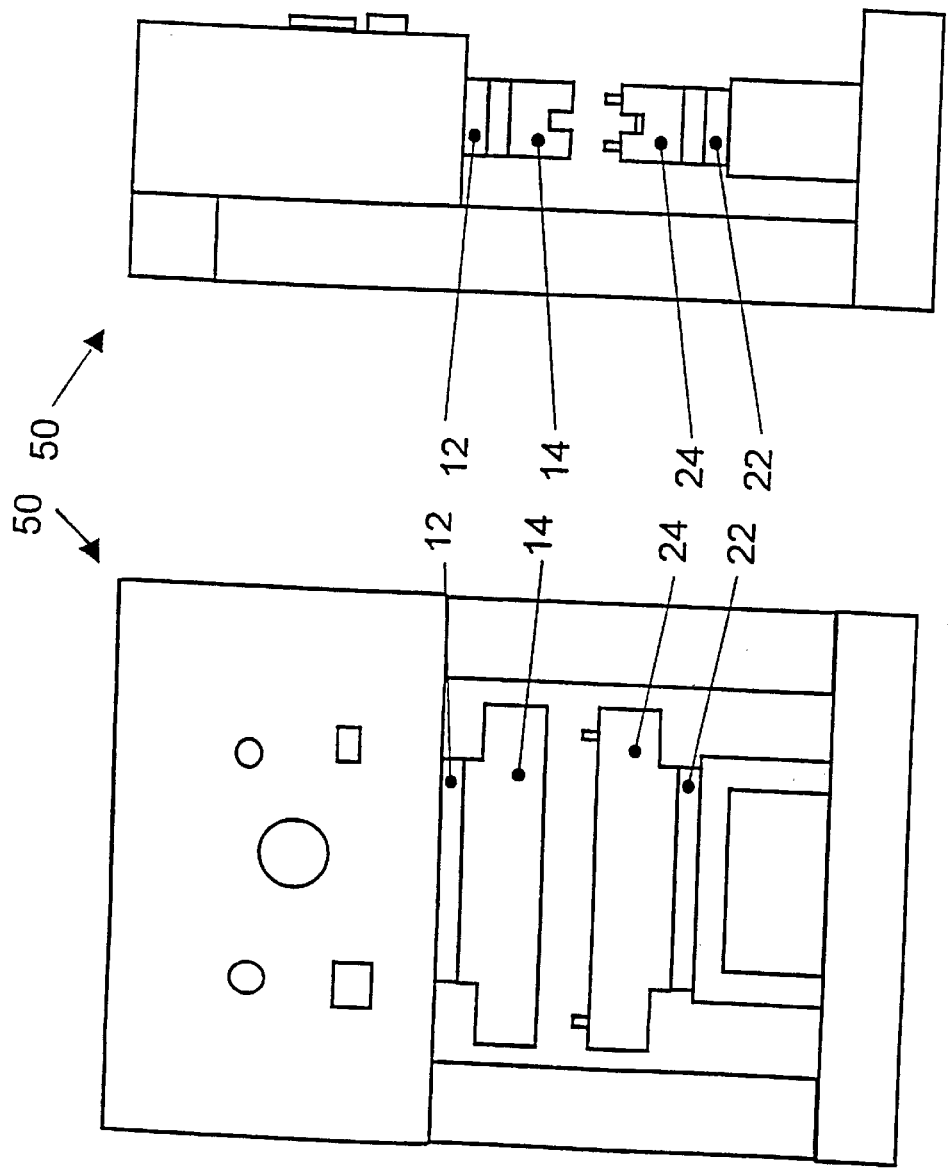
FIG. 5 is a front view of the type of stationary device on which the mold in FIGS. 2 to 4 is mounted.
FIG. 6 is a side view of the device in FIG. 5.

This mold 20 can be mounted on a device such as a stationary press of the column press type 50 shown in FIG. 5 and 6, its upper tool 14 being vertically movable and its lower tool 24 being stationary.

The closed mold 20 has an impression 28 over its entire length, defined by connection of a cavity in the upper face of the lower tool 24 and a cavity in the lower face of the upper tool 14, as shown in FIG. 3. This impression 28 opening at each of the longitudinal ends of the mold, determines the profile of the seal, the shape of the seal being independent of the transverse curvature of the impression which can therefore be completely straight. Over the entire length of the upper took 14 and on each side of its cavity is an arc-shaped groove or rubber collector 30 intended to discharge the surplus material overflowing from the impression 28 during molding.

Heating plates 12, 22 which are illustrated in FIG. 5 and 6 and of which the length is smaller than the length of the mold 20 are arranged on the upper face of the tool 14 and beneath the lower face of the tool 24 respectively. These plates are intended to heat the mold 20 in order to obtain a temperature at the faces of the impression 28 of between 150° C. and 200° C., with a nominal value of 160° C. This heating induces a constant temperature in the mold 20 over the distance D in FIGS. 1a, 1d and 2 which constitutes the active region of the mold 20, that is the region where each segment of strip is effectively molded. The heating of the plates is controlled by thermal means, not shown, usually integrated in the press used. Regulating means complement these thermal means to limit the temperature drift to ±7° C.

On each side of the active region of the mold 20, the temperature decreases gradually so as to obtain, at the ends of the mold, a temperature which is 25° C. to 35° C. lower than that of the active region, the nominal value of this deviation being 30° C. This temperature gradient is obtained owing to the dissipation of heat in the unheated volume of the mold owing to the fact that the heating plates do not act on the ends of the mold, the exchange of heat thus being greater there.

This temperature gradient, associated with the specific shape of each end of the impression 28 prevents thermal and mechanical edge effects during molding. The thermal edge effects are characterized by induction of vulcanization of the seal in the end regions of the mold, and the mechanical edge effects by marking on the surface of the seal caused by the ends of the mold during closure thereof. These are avoided owing to the inclined plane 35 illustrated in FIG. 4 with which each of the ends of the impression 28 ends. This inclined plane having an angle β of between 3 and 10 degrees and a nominal value of 5 degrees is made on the lower tool 24 which is about one tenth of the total length of the mold.

Alternatively, cooling fins provided over a proportion of the surface area of the mold increase the heat exchange area with the aim of attaining with certainty the expected temperatures gradient.

In the remainder of the description and to simplify the vocabulary, the term upstream denotes the side of the mold through which each segment of unprocessed strip 40 is supplied and downstream the side of the mold through which each segment of strip is removed once it has been molded.

As illustrated herein above and in order to produce gaskets by the molding process according to the invention, the following procedure is adopted:

The two tools 14, 24 of the mold 20 comprising the impression of the seal to be produced are firstly mounted on the press used, in parallel with the longitudinal axis of this press. In our case, we consider this mold to be mounted on the stationary press 50.

The means for controlling the heating are then actuated in order to bring the mold to the desired temperature and the means of heat regulation actuated in order to limit the drift in temperature.

The unprocessed strip 40 is positioned so as to rest on the impression in the lower tool 24.

In FIGS. 1*a* to 1*d*, S is defined as the direction of travel of the unprocessed strip 40, the right-hand side of the mold defining the upstream side and its left-hand side the downstream side.

As illustrated in FIG. 1*a*, the first end of the unprocessed strip 40 is positioned outside the active region of the mold. More specifically, the end of this strip is shifted downstream by a distance L1 at least equal to D/2 relative to the downstream edge of the active region.

Figure 1B:
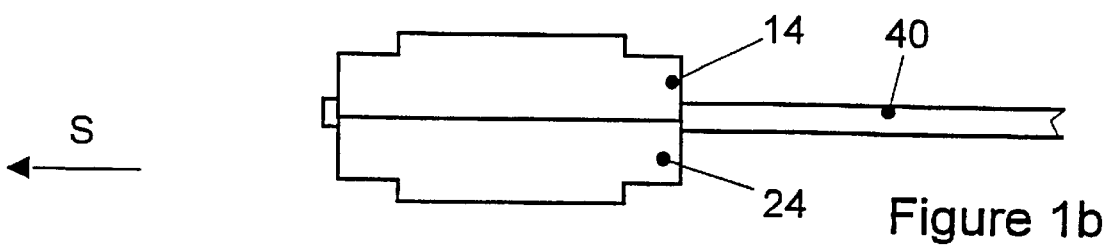

The mold is then closed, as illustrated in FIG. 1*b*, by actuating the means for vertical displacement of the press 50. It is checked that the closure pressure is between 100 and 200kg/cm², the nominal pressure being 150 kg/cm². Once this closure pressure has stabilized, the segment of unprocessed strip 40 is molded for a period of between 3 and 4 minutes, the pressure and temperature values being constant throughout molding.

Figure 1C:
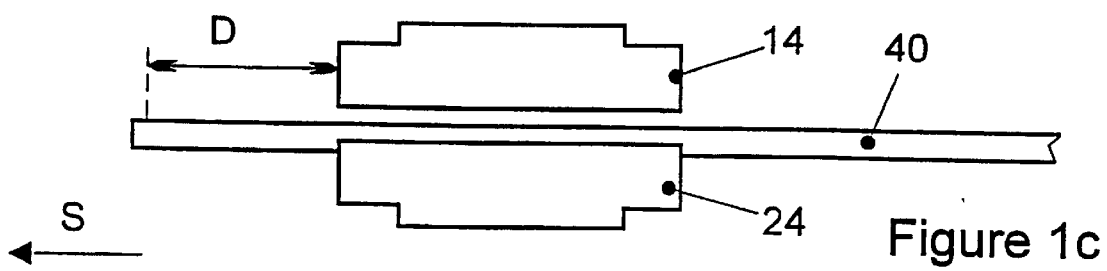

Once this time has elapsed, the mold is opened and the strip 40 is shifted in the direction of the arrow S by a distance D as shown in FIG. 1*c*. The foregoing procedure is then repeated to the end of the strip.

Figure 1D:
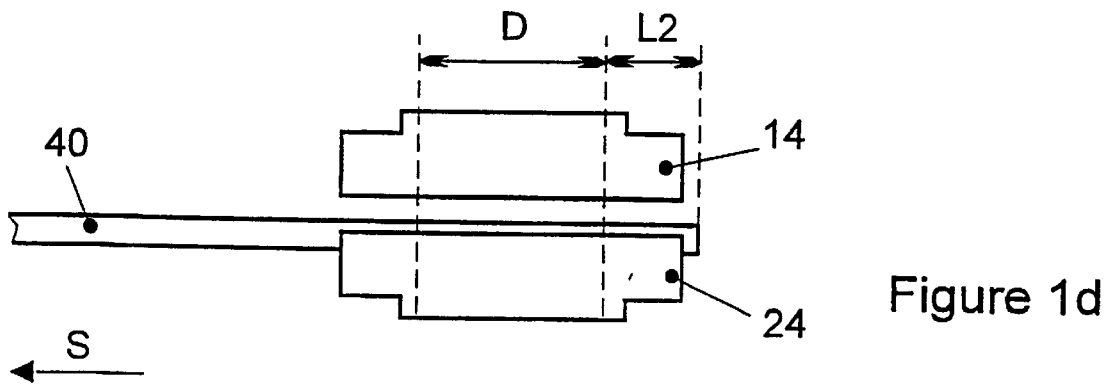

During the last pass and as illustrated in FIG. 1*d*, the downstream end of this unprocessed strip 40 is left outside the active region of the mold over a distance L2 at least equal to D/2, as for the first end.

In order to produce a completely vulcanized closed seal, the two unprocessed ends are brought together in the active region inside the mold, the joint between them preferably being located substantially in the center of this active region, and the molding of any portion of strip is carried out in the same way.

In this process, it is preferably for the total length of the two unprocessed ends not to fall below D to avoid the need for intersections with already molded adjacent regions. Thus, if this length is equal to D, it will be molded in a single pass; if this length is greater than D, complementary molding of the remaining segment of unprocessed strip will be carried out at the end, once the joint has been molded. The temperature gradient of the mold at its ends allows the possible intersection which does not effect the quality of the seal.

When the seal is complete, it is placed in an oven at a temperature of about 125° C. for a period of about 30 minutes. The object of this baking is to homogenize its characteristics.

A gasket obtained by this molding process has optimum characteristics with respect to size and elasticity; in fact, the tolerance obtained by this process are close, of the order of ±0.25 mm with a section of 15 mm and, in particular, the seal is completely vulcanized uniformly and without edge effects, including its joint, in contrast to other processes where it is usually carried out by interposition of an extraneous element.

The process as described hereinbefore allows the production of closed seals which are completely vulcanized and which can be mounted directly during first assembly or as a replacement on the units concerned. However, and in particular during maintenance operations, it is technically and/or economically impossible to install a closed seal without substantial disassembly of the machines and, incidentally, a prolonged stoppage.

The portable device such as a portable press 140 described in FIGS. 7 and 8 allows these problems to be overcome by carrying out molding on site, that is directly on the element on which the seal is to be mounted, of the joint of seals obtained by the process according to the invention, this seal still not being closed. Furthermore, it is quite conceivable completely to produce the seal in question by means of this portable press.

This portable press 140 comprises a swan-neck frame defined by a vertical base plate 101, a base 105 and an upper plate 103. On this press 140 there is mounted a mold 120 composed of an upper part or upper tool 114 and a lower part or lower tool 124, each of which is produced from aluminum or of light alloy, mainly on account of their weight.

This mold is arranged parallel to the longitudinal axis of the press, the lower tool 124 connected to a support 130 integral with the base 105 and the upper tool 114 connected to means of vertical displacement. Its structure is the same as that of the mold 20, its dimensions being related to those of the press 140 of which the bulk is lower than that of the press 50 used in the previous configuration described on account of weight and ease of handling. On the upper face of the lower tool 124, two centering pins 118 are arranged diagonally substantially at each of the two ends of the tool. These pins are intended to cooperate with corresponding orifices of complementary shape provided in the lower face of the upper tool and thus to locate the two tools during closure of the mold.

Each of the tools 114, 124 of the mold 120 of the portable press 140 comprises integrated heating means instead of the heating plates 12, 22 arranged on the external surfaces of the mold 20. These heating means are controlled by external modules for thermal control and regulation, not shown, the same constraints as for the mold 20 having to be respected relative to its temperature, the allowable temperature deviation and the temperature gradient to its ends.

These heating means are integrated in the mold 120 for reasons of confidentiality. In fact, this portable press 140 can be placed in the ownership of a customer, conversely to the formerly used stationary press 50 intended to remain with the manufacturer, in which case the customer can only use this portable press with molds supplied by the manufacturer.

Heat insulating plates 115, 127 intended to limit the heat losses during the internal heating of the mold are arranged on the respective upper faces of the tool 114 and lower faces of the tool 124 and are connected to each of them.

The vertical movability of the upper tool 114 is permitted by manual displacement means 123 such as a jack acting on the top of the tool. The guidance of this upper tool during its vertical displacement is obtained by means of adjustable pads 108 resting against the base plate 101.

To facilitate the opening of the mold, elastic means 125 are arranged between the upper plate 103 of the frame and the structure of the moving part of the mold.

Two frontal ties 102 are arranged vertically on the front face of the press, each one close to one end of the mold. These ties 102, of which one end is equipped with a manual gripping means 109 and the other end is threaded, pass through the upper plate in a tapped hole of the base 105. These ties ensure the rigidity of the unit and are removable to allow removal of the seal of which the joint has been molded in this press because the seal has thus been closed.

Alternatively, an articulated arm is provided instead of each tie. This articulated arm pivots at one of this ends round an axis, the other end cooperating with fixing means. When the fixing means are closed, the rigidity of the press unit is ensured, the opening of these fixing means allowing the arm to pivot round its axis to allow liberation of the closed seal.

This embodiment with articulated arms is easier to use than the initially described embodiment with removable ties.

As illustrated hereinbefore and to permit the molding on site of seals obtained by the process according to the invention, in particular for maintenance operations where it is not technically and/or economically possible to introduce a closed seal, the molding of the unprocessed joint of such seals is carried out as follows by means of the portable press 140 on which care has been taken to mount a mold having an impression identical to that of the mold 20 mounted on the stationary press 50.

In this case, the seal is produced as described hereinbefore, but the operation of molding the ends of the unprocessed strip 40 is not carried out with the press 50. This open seal is therefore positioned on the site in question, this seal thus being easier to install, and substantially reducing the stoppage period of the machine in question. It is then closed directly on the element on which it is to be mounted by molding by means of the portable press 140 of the joint of the two unprocessed ends.

As described hereinbefore, this joint is molded after having brought the mold 120 to the desired temperature and using the temperature regulating means.

Each of the two unprocessed ends is then positioned on the impression of the lower tool 124 in the active region of the mold, the joint between the two ends preferably being located substantially in the center of this active region. The upper tool 114 is then lowered by manually actuating the vertical displacement means 123 until the mold is closed and the closure pressure is comprised between 100 and 200 kg/cm$^2$ with a nominal value of 150 kg/cm$^2$. This state is maintained for the duration of vulcanization, that is between 3 and 4 minutes.

As the mold 120 is generally substantially smaller than the mold 20, the distance represented by the sum of the two unprocessed ends frequently exceeds the active region of the mold 120. Complementary molding of the remaining segment of unprocessed strip is finally carried out once the joint has been molded, and the seal is closed. As before, the temperature gradient of the mold at its ends allows the possible intersection which does not affect the quality of the seal.

To free the portable press henceforth held by the closed seal, unscrewing is completed and the two frontal ties 102 are removed, allowing the seal to place itself on the element on which it is to be mounted and allowing the operator to remove the press.

In the embodiment with articulated arms, the same result is achieved by opening the fixing means and causing each of the two arms to pivot round their respective axis.

This portable press 140 is preferably adapted to the molding of joints for seals obtained by the process according to the invention.

It is obviously quite possible with this portable press 140 to mold the entire seal by starting as with the stationary press 50 with an unprocessed strip 40 and by following the same stages as initially described and illustrated in FIGS. 1a to 1d.

It will have been understood from the foregoing and as already mentioned hereinbefore that the invention, although set out in detail in its application to the seals, applies more generally to all types of profile (and not only to seals). Furthermore, numerous improvements can be made to it without departing from the scope of the claims.

What is claimed is:

1. A process for molding a closed elastomeric profile in a mold from a continuous, open, unprocessed strip of elastomeric material having two ends in a static operation, the process comprising:

sequentially molding adjacent successive segments of the strip in the mold wherein each segment is displaced substantially by its same length to take a place of a previous segment after molding the previous segment by shifting the strip in the mold, wherein the first end of the strip is left unprocessed prior to molding a first segment, and wherein the second end of the strip is left unprocessed after successive operations of molding adjacent segments, abutting the first and second ends of the strip left unprocessed in the mold by juxtaposing the first and second ends of the strip to thereby form a last segment wherein the length of juxtaposition represents a length at least equal to a length of a segment, and molding the last segment of the strip in the mold to form a joint between the first and second ends to thereby form the closed elastomeric profile.

2. The process according to claim 1 wherein:

the mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold; and the length of each segment is substantially equal to the length of the active region of the mold.

3. The process according to claim 1 wherein:

the mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold such that the length of the active region of the mold is between about 35% and about 60% of the total length of the mold; and the length of each segment is substantially equal to the length of the active region of the mold.

4. A process for molding a closed elastomeric profile in a mold from a continuous, open, unprocessed strip of elastomeric material having two ends in a static operation, the process comprising:

sequentially molding adjacent successive segments of the strip in the mold wherein each segment is displaced substantially by its same length to take a place of a previous segment after molding the previous segment by shifting the strip in the mold, wherein the first end of the strip is left unprocessed prior to molding a first segment, and wherein the second end of the strip is left unprocessed after successive operations of molding adjacent segments, abutting the first and second ends of the strip left unprocessed in the mold by juxtaposing the first and second ends of the strip to thereby form a last segment wherein the length of juxtaposition represents a length at least equal to a length of a segment, and molding the last segment of the strip in the mold to form a joint between the first and second ends to thereby form the closed elastomeric profile;

wherein said process utilizes a portable molding device comprising the mold which is selected from the group of molds consisting of:

a mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold;

a mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold such that the length of the active region of the mold is between about 35% and about 60% of the total length of the mold;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold, and the ends of the cavities end at an angle between about 3 degrees and about 10 degrees;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold and a depth of the impression is greater at the ends of the mold than in a center of the mold;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold, and a temperature in an interior portion of the impression decreases gradually from each edge of the active region of the mold to each end of the mold; and a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold, and a temperature at the ends of the impression is between about 25° C. and about 35° C. lower than a temperature in a center of the active region of the mold.

5. The process according to claim 4 wherein the process is performed on site.

6. The process according to claim 4 wherein the mold further includes mold heating means and means for exerting a pressure on the unprocessed strip.

7. The process according to claim 6 wherein the mold heating means are internal to the mold.

8. An on-site finishing process for molding a closed elastomeric profile in a mold from a continuous, open, unprocessed strip of elastomeric material having two ends in a static operation, the process comprising:

sequentially molding adjacent successive segments of the strip in the mold wherein each segment is displaced substantially by its same length to take a place of a previous segment after molding the previous segment by shifting the strip in the mold, wherein the first end of the strip is left unprocessed prior to molding a first segment, and wherein the second end of the strip is left unprocessed after successive operations of molding adjacent segments, abutting the first and second ends of the strip left unprocessed in the mold by juxtaposing the first and second ends of the strip to thereby form a last segment wherein the length of juxtaposition represents a length at least equal to a length of a segment, and molding the last segment of the strip in the mold to form a joint between the first and second ends to thereby form the closed elastomeric profile;

wherein said process utilizes a portable molding device comprising the mold which is selected from the group of molds consisting of:

a mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold;

a mold comprising two tools at least one of which is movable and a connection of cavities made in internal surfaces of each of the tools defining an impression corresponding to a form of the profile to be produced, wherein the mold is open at two ends and a length of an active region of the mold is smaller than a total length of the mold such that the length of the active region of the mold is between about 35% and about 60% of the total length of the mold;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold and the ends of the cavities end at an angle between about 3 degrees and about 10 degrees;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold, and a depth of the impression is greater at the ends of the mold than in a center of the mold;

a mold comprising two tools at least one of which is movable and a connection of cavities made in internal surfaces of each of the tools defining an impression corresponding to a form of the profile to be produced, wherein the mold is open at two ends, a length of an active region of the mold is smaller than a total length of the mold, and a temperature in an interior portion of the impression decreases gradually from each edge of the active region of the mold to each end of the mold; and a mold comprising two tools at least one of which is movable, a connection of cavities made in internal surfaces of each of the tools defining an impression corresponding to a form of the profile to be produced, wherein the mold is open at two ends, a length of an active region of the mold is smaller than a total length of the mold, and a temperature at the ends of the impression is between about 25° C. and about 35° C. lower than a temperature in a center of the active region of the mold.

9. The process according to claim 8 wherein the mold further includes mold heating means and means for exerting a pressure on the unprocessed strip.

10. The process according to claim 9 wherein the mold heating means are internal to the mold.

11. A process according to claims 4 or 8 wherein the profiles comprise seals.

* * * * *